(12) United States Patent
Karchon et al.

(10) Patent No.: US 10,062,464 B2
(45) Date of Patent: Aug. 28, 2018

(54) TRITIUM HOUSING

(71) Applicant: Cammenga Company, LLC, Dearborn, MI (US)

(72) Inventors: Christopher J. Karchon, Bloomfield Hills, MI (US); Alexander J. Karchon, Birmingham, MI (US)

(73) Assignee: Cammenga Company, LLC, Dearborn, MI (US)

(*) Notice: Subject to any disclaimer, the term of this patent is extended or adjusted under 35 U.S.C. 154(b) by 0 days.

(21) Appl. No.: 15/678,678

(22) Filed: Aug. 16, 2017

(65) Prior Publication Data

US 2018/0053575 A1 Feb. 22, 2018

Related U.S. Application Data

(60) Provisional application No. 62/375,928, filed on Aug. 17, 2016, provisional application No. 62/491,678, filed on Apr. 28, 2017.

(51) Int. Cl.
| | |
|---|---|
| *G21F 5/015* | (2006.01) |
| *F41G 1/32* | (2006.01) |
| *G02B 7/02* | (2006.01) |

(52) U.S. Cl.
CPC .............. *G21F 5/015* (2013.01); *G02B 7/027* (2013.01)

(58) Field of Classification Search
CPC . F41G 1/345; F41G 1/32; F41G 1/027; F41G 1/34; F21L 27/00; F21V 15/01
USPC ........................ 42/145, 132; 362/34, 418, 551
See application file for complete search history.

(56) References Cited

U.S. PATENT DOCUMENTS

| | | | | |
|---|---|---|---|---|
| 5,065,519 | A * | 11/1991 | Bindon | F41G 1/32 42/145 |
| 5,189,245 | A * | 2/1993 | Bundy | F41G 1/393 359/820 |
| RE35,347 | E | 10/1996 | Bindon | |
| 6,233,836 | B1 * | 5/2001 | Uhlmann | F41G 1/345 42/145 |
| 6,257,734 | B1 * | 7/2001 | Tchira | F21L 4/027 362/159 |
| 7,562,486 | B2 | 7/2009 | LoRocco | |
| 9,581,316 | B2 * | 2/2017 | Karchon | F21V 15/01 |
| 2007/0107292 | A1 * | 5/2007 | Bar-Yona | F41G 1/027 42/144 |
| 2009/0013581 | A1 * | 1/2009 | LoRocco | F41G 1/345 42/132 |

(Continued)

FOREIGN PATENT DOCUMENTS

| | | |
|---|---|---|
| WO | 2016124686 A1 | 8/2016 |
| WO | 2017193002 A1 | 9/2017 |

OTHER PUBLICATIONS

International Search Report, Appl No. PCT/US2017/047255; dated Jan. 5, 2018; 4 pages.

*Primary Examiner* — David A Vanore (74) *Attorney, Agent, or Firm* — Dickinson Wright PLLC (57) ABSTRACT

A tritium housing includes a body extending from a first end to a second end to define a hollow extending therebetween. A lens is disposed adjacent and surrounded by the first end of the body and a tritium vial is disposed within the hollow to produce illumination visible through the lens. The body is comprised of a colored plastic material for magnifying and brightening the tritium illumination during a daylight use of the tritium housing.

20 Claims, 5 Drawing Sheets

(56) References Cited

U.S. PATENT DOCUMENTS

| | | | |
|---|---|---|---|
| 2010/0088944 A1* | 4/2010 | Callihan | F41G 1/01 42/145 |
| 2011/0249428 A1* | 10/2011 | Profos | F41G 1/32 362/159 |
| 2013/0097881 A1* | 4/2013 | Profos | F41G 1/345 33/263 |
| 2013/0242593 A1* | 9/2013 | LoRocco | F41G 1/345 362/551 |
| 2013/0250551 A1* | 9/2013 | Schneider | G04B 19/30 362/97.1 |
| 2014/0317989 A1* | 10/2014 | Lee | F41G 1/345 42/132 |
| 2017/0321992 A1* | 11/2017 | Erdle | F41G 1/02 |
| 2018/0010886 A1* | 1/2018 | Kind | F41G 1/345 |

* cited by examiner

TRITIUM HOUSING

CROSS-REFERENCE TO RELATED APPLICATIONS

This application claims the benefit of U.S. Provisional Patent Application No. 62/375,928 filed on Aug. 17, 2016 as well as U.S. Provisional Patent Application No. 62/491,678 filed on Apr. 28, 2017, the entire disclosures of which are incorporated herein by reference.

FIELD OF THE DISCLOSURE

The present disclosure relates generally to a housing which includes or incorporates tritium. More specifically, the present disclosure relates to a housing which encapsulates and protects a glass vial of tritium.

BACKGROUND OF THE INVENTION

This section provides a general summary of background information and the comments and examples provided in this section are not necessarily prior art to the present disclosure.

Tritium is a radioactive isotope of hydrogen which can be used as a luminary device for watches, compasses, knives, guns, tools, and the like. For example, tritium is often incorporated into a sighting device for firearms, archery bows, or the like. However, tritium is not readily visible when the sighting device is utilized during the daytime. Accordingly, prior art sighting devices, such as those disclosed in U.S. Reissue Pat. No. 35,347 to Trijicon, Inc., have made attempts to manually paint a white ring adjacent a first end of a tritium housing to add distinction and brightness to the tritium illumination during the daytime. However, such prior attempts are extremely labor intensive, especially when one considers that the white ring must be intricately painted around a housing that is only 2.0-2.5 mm in width. Furthermore, any painted white ring is subject to wearing off, chipping, and even fading during continued use of the sighting device. Thus, other prior art sighting devices, such as those disclosed in U.S. Pat. No. 7,562,486 to TruGlo, Inc., have made attempts to press or install a colored mounting ring over a first end of a tritium housing after the tritium housing has been inserted into a sighting device. Relatedly, other prior art tritium housings, such as those disclosed in WO 2016/124686 to MB-Microtec AG have made attempts to secure or arrange a separate colored ring body to a first end of a tritium housing prior to its placement within the sighting device. However, such prior attempts necessarily require additional manufacturing steps and parts (and thus expense) to incorporate and secure the colored rings to the tritium housing. Accordingly, there remains a continuing need for an improved tritium housing.

SUMMARY OF THE INVENTION

This section provides a general summary of the disclosure and is not intended to be a comprehensive disclosure of its full scope, aspects, objectives, and/or all of its features.

The subject invention provides for a tritium housing including a body extending along an axis A from a first end to a second end to define a hollow extending therebetween. A lens is disposed adjacent and surrounded by the first end of the body and a tritium vial is disposed within the hollow to produce illumination that is visible through the lens. The body is comprised of a colored, plastic material for adding distinction and brightness to the tritium illumination during a daylight use of the tritium housing. In other words, since the first end of the body is directly visible to an environment of the housing and is comprised of the same colored, plastic material as the body, the first end of the body advantageously provides visible distinction to the tritium illumination without the need to include and secure additional components, such as a highlighting ring, to the first end of the housing, or require other process steps, such as painting or ink printing the first end, during the manufacture of the tritium housing. Accordingly, the subject tritium housing builds-in or incorporates magnification and illumination of the tritium vial which is otherwise not possible in the prior art tritium housings without additional components, manufacturing steps, and expense.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF THE ENABLING EMBODIMENTS

Example embodiments of a housing which includes or incorporates a tritium vial in accordance with the present disclosure will now be more fully described. Each of these example embodiments are provided so that this disclosure is thorough and fully conveys the scope of the inventive concepts, features and advantages to those skilled in the art. To this end, numerous specific details are set forth such as examples of specific components, devices and mechanisms associated with the housings to provide a thorough understanding of each of the embodiments associated with the present disclosure. However, as will be apparent to those skilled in the art, not all specific details described herein need to be employed, the example embodiments may be embodied in many different forms, and thus should not be construed or interpreted to limit the scope of the disclosure.

Figures 1, 2:
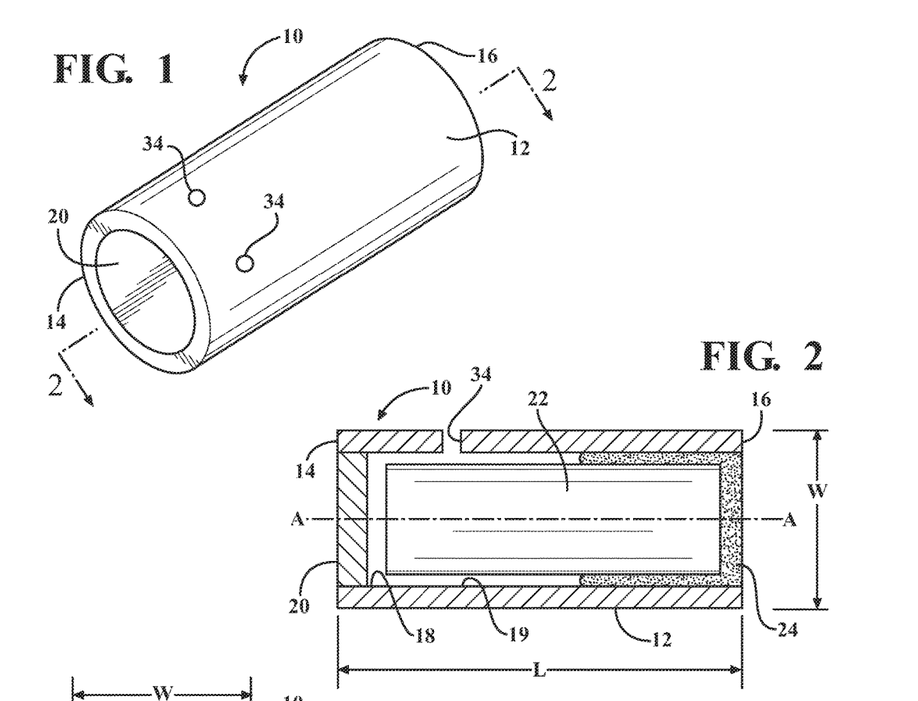
FIG. 1 illustrates a perspective view of a first embodiment of a housing which includes a body extending from a first end to a second end to define a hollow for receiving a tritium vial.
FIG. 2 illustrates a side, cross-sectional view of the first embodiment of the housing.
Figure 3:
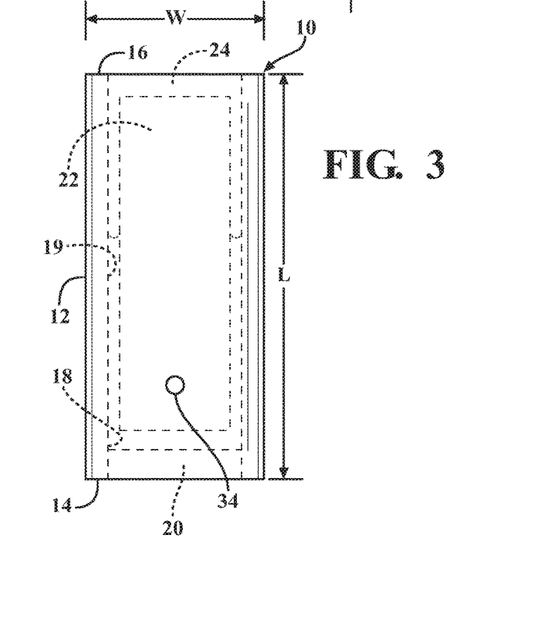
FIG. 3 illustrates a top view of the first embodiment of the housing.
Figure 4:
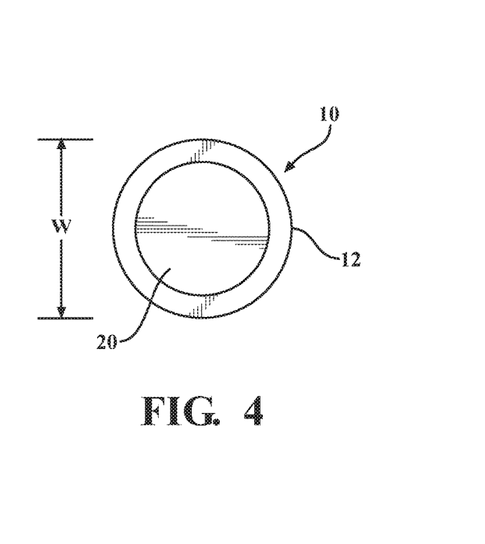
FIG. 4 illustrates a first end view of the first embodiment of the housing.
Figures 5, 6:
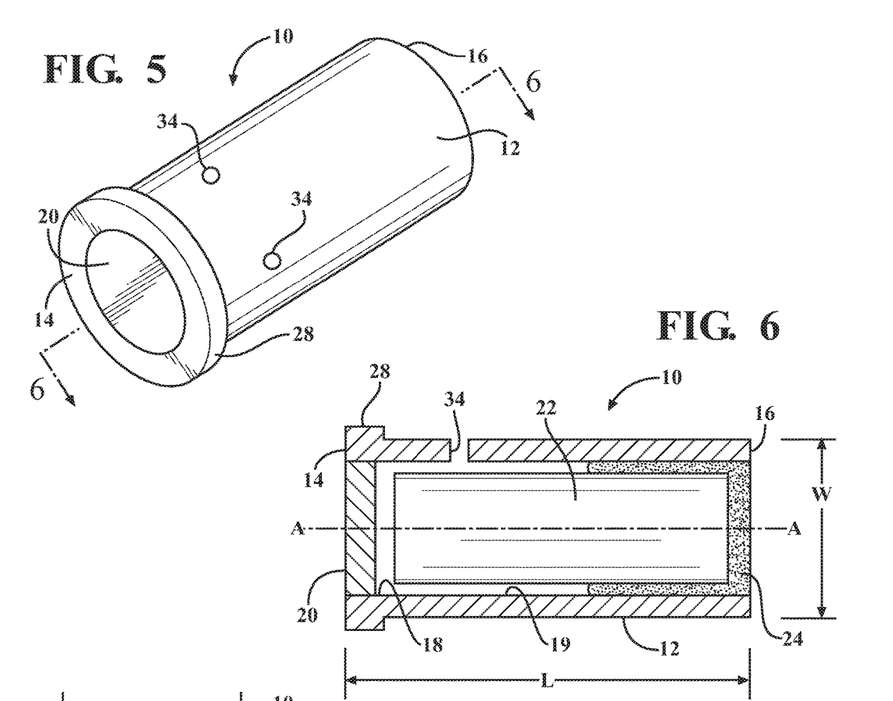
FIG. 5 illustrates a perspective view of a second embodiment of the housing including a flange integral with and extending from the first end of the body.
FIG. 6 illustrates a side, cross-sectional view of the second embodiment of the housing.
Figure 7:
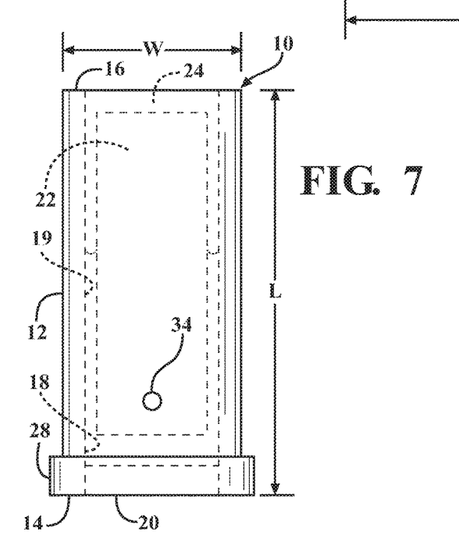
FIG. 7 illustrates a top view of the second embodiment of the housing.
Figure 8:
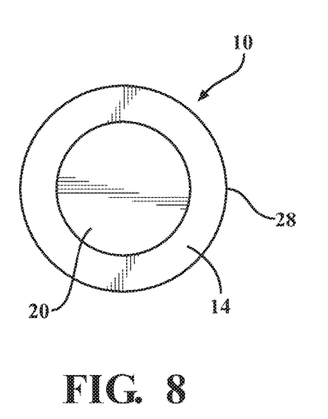
FIG. 8 illustrates a first end view of the second embodiment of the housing.
Figures 9, 10:
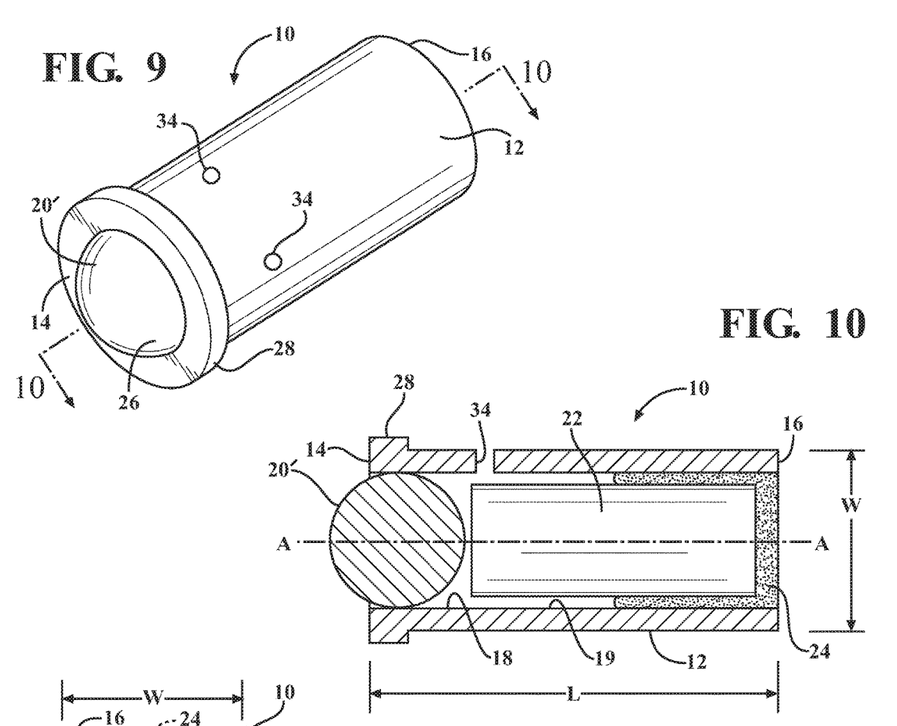
FIG. 9 illustrates a perspective view of a third embodiment of the housing including a spherical lens extending outwardly from the first end of the body.
FIG. 10 illustrates a side, cross-sectional view of the third embodiment of the housing.
Figure 11:
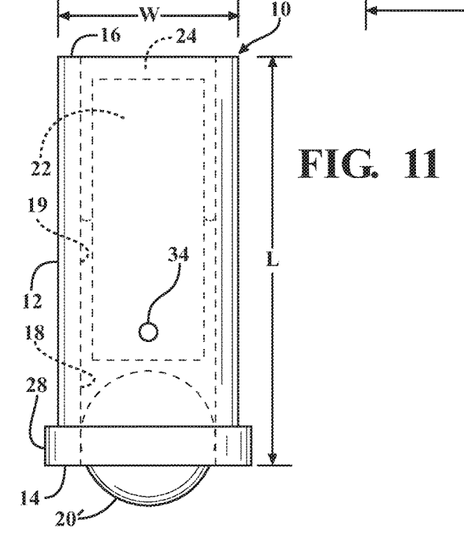
FIG. 11 illustrates a top view of the third embodiment of the housing.
Figure 12:
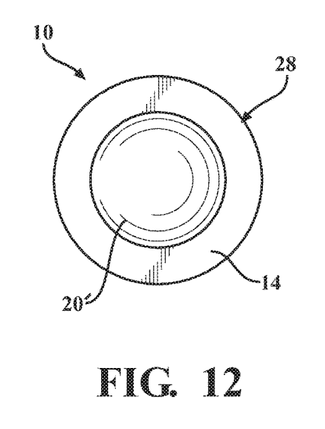
FIG. 12 illustrates a first end view of the third embodiment of the housing.
Figures 13, 14:
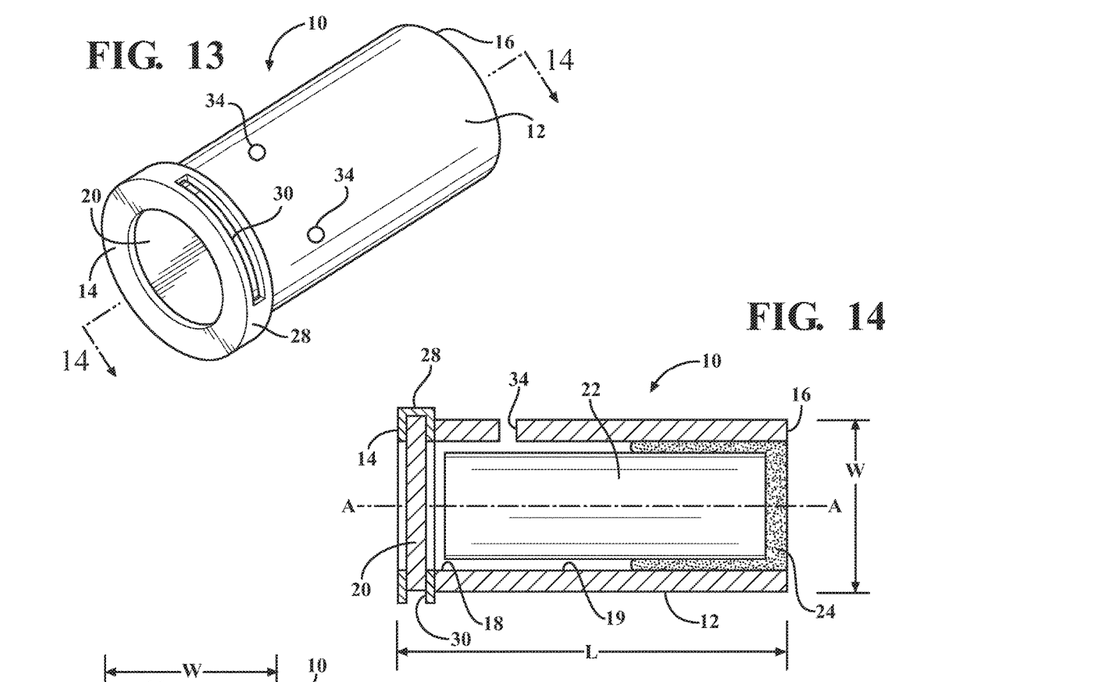
FIG. 13 illustrates a perspective view of a fourth embodiment of the housing including a slot defined by the first end of the body for receiving a lens.
FIG. 14 illustrates a side, cross-sectional view of the fourth embodiment of the housing.
Figure 15:
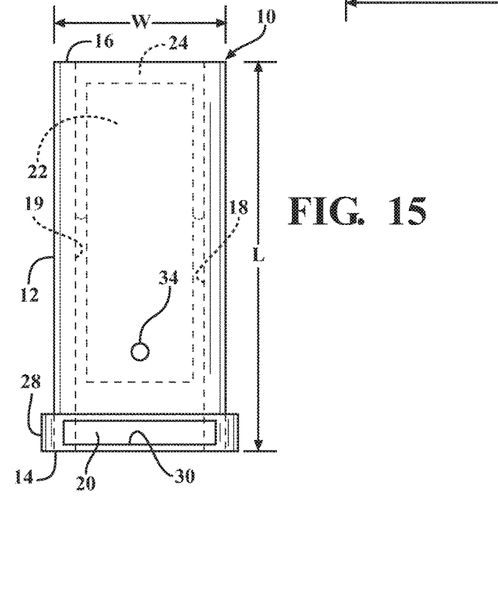
FIG. 15 illustrates a top view of the fourth embodiment of the housing.
Figure 16:
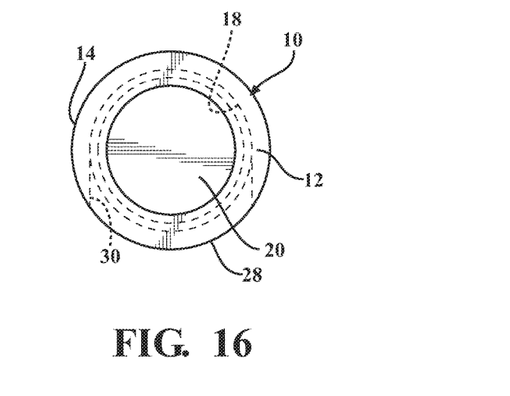
FIG. 16 illustrates a first end view of the fourth embodiment of the housing.
Figures 17, 18:
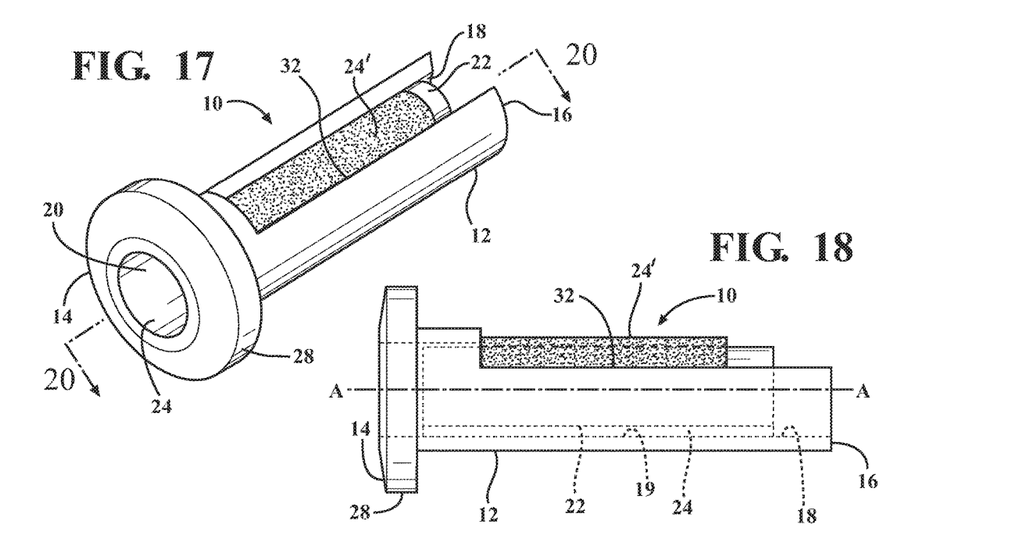
FIG. 17 illustrates a perspective view of a fifth embodiment of the housing including a slot defined by the body and extending from the second end for allowing the tritium vial to be inserted through a side or top of the body.
FIG. 18 illustrates a side view of the fifth embodiment of the housing.
Figure 19:
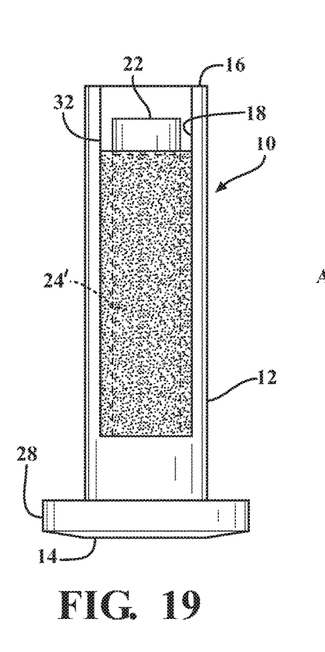
FIG. 19 illustrates a top view of the first embodiment of the housing.
Figure 20:
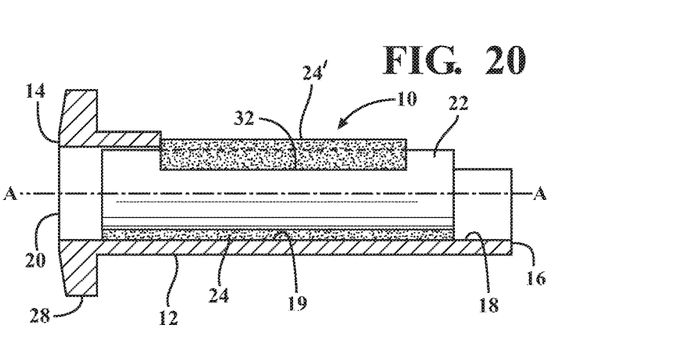
FIG. 20 illustrates a side, cross-sectional view of the fifth embodiment of the housing.
Figure 21:
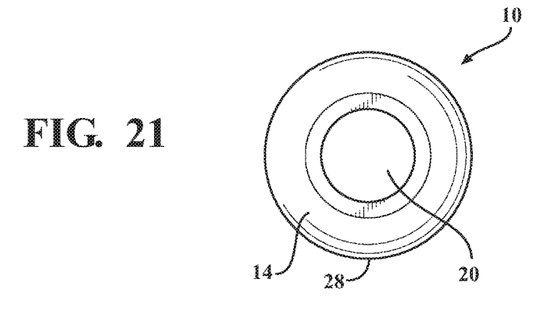
FIG. 21 illustrates a first end view of the fifth embodiment of the housing.

FIGS. 1-21 are views of a housing 10 in accordance with various aspects of the subject disclosure. As best shown therein, in each aspect the housing 10 includes a body 12 extending along an axis A from a first end 14 to a second end 16 to define a hollow 18 having an inner hollow surface 19 extending therebetween. In a preferred arrangement, the body 12 has a tubular shape and is approximately 2.5 mm (+/−2.0 mm) in width and approximately 7 mm (+/−5.0 mm) in length. However, other shapes and sizes could be utilized without departing from the scope of the subject disclosure. The housing 10 includes a lens 20 that is preferably integral with and surrounded by the body 12 next adjacent the first end 14. A glass vial of tritium 22 is disposed within the hollow 18 and is visible by a user through the lens portion 20. In a preferred arrangement, the lens 20 is comprised of a transparent or translucent material, such as an injection molded plastic, for allowing illumination produced by the tritium vial 22 to be viewable by the user through the lens 20. However, the lens 20 could also be comprised of glass, sapphire, mineral, silicone, or other type of lens material without departing from the subject disclosure. As will be appreciated by the aforementioned disclosure, when the housing 10 is incorporated into a device, such as a watch, compass, knife, gun, tool, and the like, the tritium vial 22 provides aesthetic benefits for the device by illuminating a portion of the device and allowing a user to see the device at all times.

In a preferred arrangement, the body 12 is micro-molded with the lens 20 to establish the integral relationship therebetween. However, when the lens 20 is comprised of glass, the body portion 12 could alternatively be molded around the lens portion 20, or integrally connected with the lens 20 through any other well-known connection means, such as adhesive bonding, heat sealing, fusing, press-fitting, clamping, or fastening, without departing from the scope of the subject disclosure. In either arrangement, the first end 14 of the body 12 is not obstructed by the lens 20 (or covered by any other components or materials), and thus is directly visible by a user and exposed to the environment of the housing 10 when incorporated into the respective device.

The body 12 is comprised of a colored, plastic material, such as a polycarbonate, nylon, or the like, for providing distinction and brightness to the tritium illumination during a daylight use of the tritium housing 10. Accordingly, the first end 14 of the body 12, which is also comprised of the same colored, plastic material and directly visible by a user and exposed to the environment of the housing (i.e., not covered by additional components such as rings or painted or printed over by inks) provides a less expensive and more robust approach to magnifying and brightening the tritium illumination during a daylight application of the housing 10 relative to the prior art designs. In a preferred embodiment, the body 12 is comprised of a white, green, yellow, orange, pink, or purple colored material. However, other colors could be utilized without departing from the scope of the subject disclosure. In an even more preferred embodiment, the body 12 is also comprised of a phosphorescent, colored plastic material to provide an additional glowing effect to the illumination produced by the tritium vial 22.

As previously discussed, any tritium 22 incorporated into the housing 10 is often provided in a glass vial and thus susceptible to damage and/or breakage. However, tritium is a radioactive isotope of hydrogen and thus the use of tritium in products is closely regulated by the various U.S. governmental agencies to protect the health and safety of the public and the environment. Toward that end, the use and incorporation of the tritium glass vials into products must sufficiently establish that the tritium vials are adequately protected from damage or breakage during their regular and everyday use. Absent such proof, the use and incorporation of tritium glass vials into said products is simply not permitted by the various U.S. governmental agencies. The disposal of the tritium glass vials 22 within a housing 10 having a plastic body 12 allows the body 12 to provide protection from such damage and/or breakage and meet these strict governmental regulations. Furthermore, as best shown in FIGS. 2-3, 6-7, 10-11, and 14-15, in an aspect, the second end 16 of the body portion 12 can include an adhesive 24 to encapsulate the tritium vials 22 within the hollow 18 and maintain and secure the tritium vials 22 placement within and longitudinally along the housing 10. Thus, the placement and securement of the glass tritium vial 22 between the first and second ends 14, 16 of the housing encapsulates the tritium vials 22 within the hollow 18 and further serves to protect the tritium vials 22 from impact, chemicals, water, or other environmental conditions of the housing 10 which could otherwise damage or break the tritium vial 22. Put another way, the housing 10 nests or embeds the tritium vials 22 within its hollow 18, which can then be secured between the first and second ends 14,16 to effectively isolate or reduce exposure of the tritium vials 22 to various environmental impacts encountered by the housing 10. Thus, the housing 10 helps facilitate the meeting of the necessary requirements of the U.S. governmental organizations to incorporate tritium into a number of devices.

With reference to FIGS. 1-8 and 13-21, the lens 20 could be comprised of a circular, glass or plastic, disk, i.e., hockey puck shaped, which is preferably disposed flush with a first end 14 of the housing 10. However, as best illustrated in FIGS. 9-12, in an alternative arrangement the lens 20 could also be comprised of a spherical, glass or plastic, lens 20' which extends outwardly from a first end 14 of the housing 10 to improve the optics of the illumination produced by the tritium vial 22 disposed within the housing 10. For example, the spherical lens 20' allows the illumination produced by the tritium vial 22 to be viewable by the user from a wider range of angles relative to the first end 14 when the housing 10 is incorporated into its respective device. Additionally, because the spherical lens 20' has a larger viewable surface area than the circular, disk lens 20, the use of the spherical lens 20' facilitates the use of a smaller vial of tritium 22 to be used within the housing 10 because the spherical lens 20' leads to more viewable illumination than that produced by a circular lens 20.

As best illustrated in FIGS. 5-21, in a preferred arrangement, the housing 10 includes a flange 28 which is integral with the body 12 and extends radially outwardly from the first end 14 for use in facilitating placement of the housing 10 within the respective device. In other words, the body 12 is a monolithic structure inclusive of the first end 14 and the flange 28 extending radially therefrom. If the housing 10 is to be incorporated into a sighting device, the sighting device can include an orifice for receiving a tritium vial, with the orifice often being stepped to define at least one shoulder. Accordingly, the flange 28 advantageously mates with the corresponding shoulder of the sighting device to facilitate easy and reliable placement of the housing 10 within the gun sight cavity, preferably placing the lens 20 flush with an exterior surface of the sighting device. Similar results would stem from incorporation of the housing 10 into any other devices, such as a thumb stud of a knife, which also can define an orifice which is stepped to define at least one shoulder. Since the flange 28 is integral with the body, the flange 28 is also comprised of the same, colored plastic material and thus provides a larger visible colored surface of the first end 14 for further distinction and brightness to the illumination produced by the tritium vial 22.

As best illustrated in FIGS. 13-16, in an alternative arrangement, the flange 28 of the housing 10 can define a slot 30 or side opening for receiving the circular disk lens 20. However, if the housing 10 does not include a flange 28, the first end 14 of the body portion 12 could define the slot 30. In either arrangement, the circular disk lens 20 can be slid through the slot 30 to enclose the hollow 18. Once the circular disk lens 20 is in place, the slot 30 can be closed, such as through glue, or the like, to secure the circular disk lens 20 within the housing 10 and secure the tritium vial 22 within the hollow 18 defined by the body 12.

As best illustrated in FIGS. 17-21, in an alternative arrangement, the body 12 defines a slit 32 extending from the second end 16 for allowing the tritium vial 22 to be inserted into the hollow 18 through a side or top of the housing 10 instead of through the second end 16 of the housing 10, as required by each of the other aspects. As previously mentioned, in an aspect, the body 12 and flange 28 of the housing 10 are over-molded to the lens portion 20. Thus, it can sometimes be difficult to insert the tritium vial 22 through an opening provided in the second end 16 of the housing 10. The slit 32 advantageously provides for an easier insertion of the tritium vial 22 into the hollow 18, namely through the top or side of the housing 10. Additionally, the slit 32 allows for the insertion of the tritium vial 22 to more easily be automated, namely because insertion of the tritium vial 22 through the top or side of the housing provides for a relatively hands-off procedure.

As described previously, in accordance with the other aspects, the tritium vial 22 is secured between the first and second ends 14, 16 by placing adhesive 24, bonding material, or the like within the hollow 18 through the second end 16. However, the adhesive 24 or bonding material can end up displaced out of the second end 16 of the housing, or even disposed between the lens portion 20 and the tritium vial 22 after assembly, thus reducing or blocking some of the viewable illumination produced by the tritium vial 22. Accordingly, as best illustrated in FIGS. 1-2, 5-6, 9-10, and 13-14, the body 12 can define at least one weep hole 34 disposed adjacent the first end 14 and in fluid communication with the hollow 18 for providing an area for excess adhesive 24 to escape and correspondingly prevent build-up of adhesive 24 between the lens 20 and tritium vial 22. In a preferred arrangement, the at least one weep hole 34 includes a plurality of weep holes 34 disposed in spaced relationship circumferentially along the body 12 adjacent the first end 14.

With reference to FIGS. 17-21, the slit 32 does not require the incorporation of weep holes 34 into the body as the slit 32 allows a first layer of the adhesive 24 or bonding material to be placed along the inner hollow surface 19 of the housing 22 before laying the tritium vial 22 inside the hollow 18. Accordingly, the tritium vial 22 does not displace or force adhesive 24 out of the second end 16 of the housing or between the lens 20 and the tritium vial 22 when it is laid over-top of the first layer of adhesive 24. The slit 32 also allows another second layer of adhesive 24' or bonding material to be placed over the tritium vial 22 and extending along the slit 32 once the tritium vial 22 is disposed within the hollow 18. Accordingly, the slit 32 provides an improved method of securing the tritium vial 22 within the hollow 18 which avoids adhesive ending up between the lens portion 20 and the tritium vial 22 without the need to employ weep holes in the body 12 of the housing 10.

In any of the aforementioned aspects, the adhesive 24, 24' or bonding material can be comprised of a reflective material to provide brighter illumination through the lens portion 20. In other words, a reflective adhesive 24, 24' or bonding material can provide superior tritium illumination output and improve visibility of the tritium housing 10 during both day and nighttime conditions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tritium housing comprising:
   a body extending along an axis A from a first end to a second end to define a hollow extending therebetween;
   a lens disposed adjacent and surrounded by said first end of said body;
   a tritium vial disposed within said hollow to produce illumination visible through said lens;
   said body comprised of a colored plastic material for magnifying and brightening said tritium illumination during a daylight use of said tritium housing;
   a flange integral with said body and extending radially from said first end for facilitating placement of the housing within a respective device;
   an adhesive disposed within said hollow for securing said tritium vial between said first and second ends of said body; and
   said body defining at least one weep hole disposed adjacent said first end and in fluid communication with said hollow for allowing excess adhesive to escape out of the housing and prevent the build-up of said adhesive between said lens and said tritium vial.

2. A tritium housing as set forth in claim 1, wherein said adhesive is disposed adjacent said second end to encapsulate said tritium vial within said hollow.

3. A tritium housing as set forth in claim 1, wherein said lens is integral with said body.

4. A tritium housing as set forth in claim 3, wherein said body is micro-molded with said lens to establish said integral relationship.

5. A tritium housing as set forth in claim 1, wherein said body is comprised of a white, green, yellow, orange, pink, or purple colored plastic material.

6. A tritium housing as set forth in claim 5, wherein said body is further comprised of a phosphorescent material for providing a glowing effect to said tritium illumination.

7. A tritium housing comprising:
a body extending along an axis A from a first end to a second end to define a hollow extending therebetween;
a lens disposed adjacent and surrounded by said first end of said body;
a tritium vial disposed within said hollow to produce illumination visible through said lens;
said body comprised of a colored plastic material for magnifying and brightening said tritium illumination during a daylight use of said tritium housing;
a flange integral with said body and extending radially from said first end for facilitating placement of the housing within a respective device;
an adhesive disposed within said hollow for securing said tritium vial between said first and second ends of said body; and
said body defining a slit extending from said second end for allowing said tritium vial to be inserted into said hollow through a side of the housing.

8. A tritium housing as set forth in claim 7, wherein said hollow having an inner hollow surface extending between said first and second ends of said body and said adhesive including a first layer of adhesive extending along said tritium vial and said inner hollow surface.

9. A tritium housing as set forth in claim 8, wherein said adhesive includes a second layer of adhesive extending along said tritium vial and next adjacent said slit.

10. A tritium housing as set forth in claim 7, wherein said lens is spherical and extends outwardly from said first end of said body for allowing said tritium illumination to be viewable from a wider range of angles defined relative to said first end of said body.

11. A tritium housing as set forth in claim 7, wherein said lens is integral with said body.

12. A tritium housing as set forth in claim 11, wherein said body is micro-molded with said lens to establish said integral relationship.

13. A tritium housing as set forth in claim 7, wherein said body is comprised of a white, green, yellow, orange, pink, or purple colored plastic material.

14. A tritium housing as set forth in claim 13, wherein said body is further comprised of a phosphorescent material for providing a glowing effect to said tritium illumination.

15. A tritium housing comprising:
a body extending along an axis A from a first end to a second end to define a hollow extending therebetween;
a lens disposed adjacent and surrounded by said first end of said body;
a tritium vial disposed within said hollow to produce illumination visible through said lens;
said body comprised of a colored plastic material for magnifying and brightening said tritium illumination during a daylight use of said tritium housing;
a flange integral with said body and extending radially from said first end for facilitating placement of the housing within a respective device;
an adhesive disposed within said hollow for securing said tritium vial between said first and second ends of said body; and
said adhesive comprised of a reflective material to reflect and direct tritium illumination produced within said hollow towards said lens.

16. A tritium housing as set forth in claim 15, wherein said lens is integral with said body.

17. A tritium housing as set forth in claim 16, wherein said body is micro-molded with said lens to establish said integral relationship.

18. A tritium housing as set forth in claim 15, wherein said body is comprised of a white, green, yellow, orange, pink, or purple colored plastic material.

19. A tritium housing as set forth in claim 18, wherein said body is further comprised of a phosphorescent material for providing a glowing effect to said tritium illumination.

20. A tritium housing comprising:
a body extending along an axis A from a first end to a second end to define a hollow extending therebetween;
a lens disposed adjacent and surrounded by said first end of said body;
a tritium vial disposed within said hollow to produce illumination visible through said lens;
said body comprised of a colored plastic material for magnifying and brightening said tritium illumination during a daylight use of said tritium housing;
a flange integral with said body and extending radially from said first end for facilitating placement of the housing within a respective device; and
said flange defining a slot for receiving said lens and placing said lens adjacent said first end of said body.

* * * * *